Patented June 13, 1933

1,914,348

UNITED STATES PATENT OFFICE

IRVING P. WHITEHOUSE, OF ERIE, PENNSYLVANIA, ASSIGNOR TO HUGH C. LORD, OF ERIE, PENNSYLVANIA

CUSHION SUPPORT    REISSUED

Application filed February 13, 1932. Serial No. 592,723.

The present invention is designed to improve cushion supports and is particularly useful with joints designed to form mountings for loads which it is desired to cushion and in many cases where it is desired to absorb the periodic vibrations so that they may not be transmitted from one to the other of said members. In the present invention a supporting wall is provided, preferably an annular shell. A rubber wall is arranged on this supporting wall and carries its load in shear, the rubber wall being recessed, or sloped, at one end so that when the joint is bottomed at that end there is clearance for the rubber wall in a shear direction relatively to the shell. In this way a self-contained joint is made which provides its own support so that when its load is placed upon the rubber wall the rubber wall moving in response to shear has ample space to accommodate the normal joint movement. This space also is desirable in that it affords a housing and space for a securing means, such as a screw, or bolt, by means of which the load is attached to the joint. Features and details of the invention will appear from the specification and claims.

Preferred embodiments of the invention are illustrated in the accompanying drawing as follows:—

Figure 1:
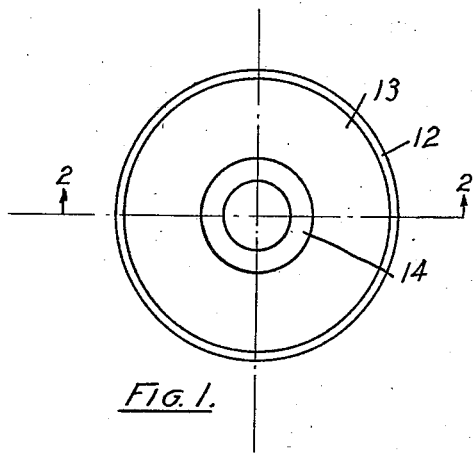

Fig. 1 shows a plan view of a joint.

Figure 2:
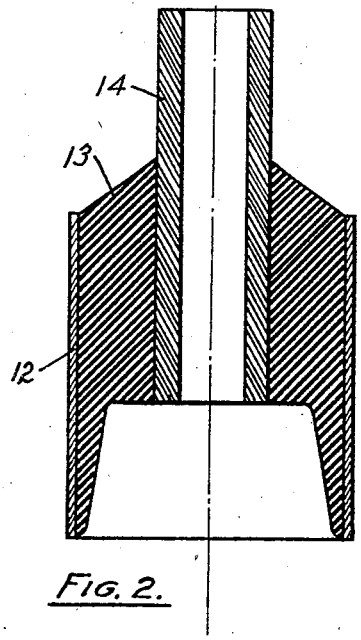

Fig. 2 a section on the line 2—2 in Fig. 1.

Figure 3:
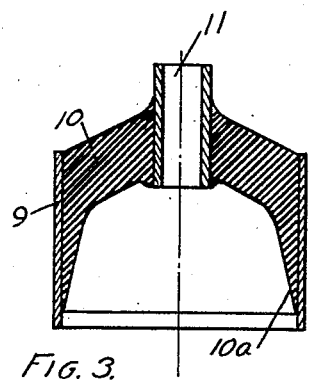

Fig. 3 a central section of a slightly modified joint.

Figure 4:
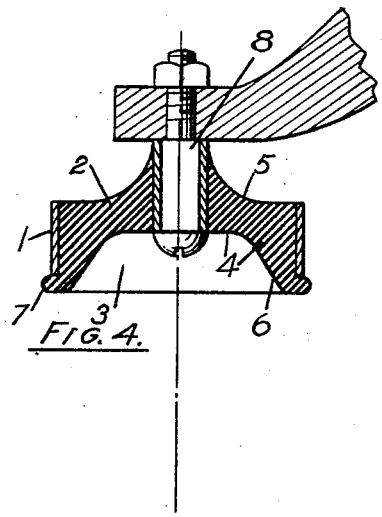

Fig. 4 a similar section showing a further modification.

In the structure shown in Fig. 4, 1 marks an annular shell forming the supporting wall for the joint, and 2 the rubber wall. This is secured to the annular shell, preferably by bonding during vulcanization, so that the rubber within the shell is subjected to initial tension as it cools after vulcanization. The rubber wall has a recess, or is spaced from the bottom of the joint, forming a clearance space 3 which accommodates the shear movement of the rubber and also affords a housing, or space for the head of a screw, or bolt $a$, by means of which the load as A is secured to the joint. The under-face 4 of the rubber wall is preferably inclined, or sloped, from the shell toward the center and the upper face 5 is sloped upwardly from the shell, both surfaces of the rubber wall, therefore, sloping in the same direction. This slope tends to give space below the rubber wall and raises the upper end of the joint at the center so as to give shear clearance for a downward movement of the rubber at the top before reaching a level of the shell. The rubber wall is preferably continued at 6 along the outer shell to the bottom. This gives a greater surface for securing the wall and also simplifies the molding operation. The rubber is extended at 7 around the bottom edge of the shell forming a cushion for the lower edge of the joint.

A metal support for the load as shown is in the form of a tube 8 which receives the bolt $a$. This is preferably secured to the rubber wall during vulcanization. Some metal support definitely secured to the rubber wall is preferable in that it forms a means by which the load may be definitely attached.

In Fig. 3 a surrounding shell 9 is provided, a rubber wall 10 and an inner tube 11. The rubber is preferably secured to the shell and tube by bonding during vulcanization. The wall of rubber does not have the inclination of the structure shown in Fig. 4 and the lower edge at 10a terminates above the lower end of the shell. A very much larger clearance space is provided in this structure than in Fig. 4.

In Figs. 1 and 2, 12 marks this rounding shell, 13 the wall of rubber and 14 the load carrying central tube. Here the wall of rubber is much longer with relation to the diameter of the joint than in the other figures and indicates the extension of the wall in a shear direction. The metal load carrying means is extended above the joint. The upper surface of the joint is given a definite bevel and the space below the joint, or recess, is ample to accommodate the shear movement and also to house a securing means, if desired.

While I have shown an annular structure, the rubber may project from the face of a supporting wall to carry the load in shear and provide the clearance. The walls may be merely opposing walls, or a surrounding wall, as indicated. While I have indicated diagrammatically a load on the structure shown in Fig. 4, it will be understood that similarly a load may be secured to any of the modifications. This load may be one absorbing periodic vibrations, or it may have a cushioning effect.

What I claim as new is:—

1. In a support, a supporting side wall substantially undistortable under normal load, a comparatively flexible rubber part in load carrying relation, having union with and projecting angularly from the side wall, and disposed a substantial distance from an end of the supporting wall forming a recess providing for movement of the rubber part toward the offset free edge of the side wall, and means receiving a load carried by the rubber part, said support being so constructed and arranged that the normal load thrust on the rubber part is carried by rubber in shear.

2. In a support, a rigid supporting side wall, a flexible rubber part bonded to the wall and projecting therefrom in load carrying relation thereto, and disposed a substantial distance from an end of the supporting wall forming a recess providing for movement of the rubber part toward the offset free edge of the side wall, and means receiving a load carried by the rubber part, said support being so constructed and arranged that the normal load thrust on the rubber part is carried by rubber in shear.

3. In a support, a supporting side wall substantially undistortable under normal load, a comparatively flexible rubber part in load carrying relation, having union with and projecting angularly from the side wall, and disposed a substantial distance from an end of the supporting wall forming a recess providing for movement of the rubber part toward the offset free edge of the side wall, and means receiving a load carried by the rubber part, said support being so constructed and arranged that the normal load thrust on the rubber part is carried by rubber in shear, comprising a metal load support bonded to the rubber part.

4. In a support, a supporting side wall substantially undistortable under normal load; and a comparatively flexible rubber part in load carrying relation having union with and projecting angularly from the side wall and disposed a substantial distance from an end of the supporting wall forming a recess providing for movement toward the free edge of the side wall, and extending beyond the opposite edge of the side wall, and adapted to receive the normal load on the rubber part with its load thrust spaced from the side wall and carried by the rubber in shear relatively to the side wall.

5. In a support, a rigid supporting side wall, a flexible rubber part bonded to the wall and projecting therefrom in load carrying relation thereto, and disposed a substantial distance from an end of the supporting wall forming a recess providing for movement toward the free edge of the side wall and extending beyond the opposite edge of the side wall and adapted to receive the normal load on the rubber part with its load thrust spaced from the side wall and carried by the rubber in shear relatively to the side wall.

6. In a support, a supporting side wall substantially undistortable under normal load; and a comparatively flexible rubber part in load carrying relation having union with and projecting angularly from the side wall, and disposed a substantial distance from an end of the supporting wall forming a recess providing for movement toward the free edge of the side wall and extending beyond the opposite edge of the side wall, and a metal supporting means bonded to the extended end of the rubber part and adapted to receive the normal load on the rubber part with its load thrust spaced from the side wall and carried by the rubber in shear relatively to the side wall.

7. In a support, a surrounding supporting side wall substantially undistortable under normal load, a comparatively flexible rubber part in load carrying relation, having union with and projecting angularly from the side wall, and disposed a substantial distance from an end of the supporting wall forming a recess providing for movement of the rubber part toward the offset free edge of the side wall, and means receiving a load carried by the rubber part, said support being so constructed and arranged that the normal load thrust on the rubber part is carried by rubber in shear.

8. In a support, a surrounding supporting side wall substantially undistortable under normal load; and a comparatively flexible rubber part in load carrying relation having union with and projecting angularly from the side wall and disposed a substantial distance from an end of the supporting wall forming a recess providing for movement toward the free edge of the side wall, and extending beyond the opposite edges of the side wall, and adapted to receive the normal load on the rubber part with its load thrust spaced from the side wall and carried by the rubber in shear relatively to the side wall.

9. In a support, a surrounding supporting side wall substantially undistortable under normal load, a comparatively flexible rubber part in load carrying relation, having union with and projecting angularly from the side wall, and disposed a substantial distance from an end of the supporting wall forming a recess providing for movement of the rubber part toward the offset free edge of the side wall, and means receiving a load carried by the rubber part, said support being so constructed and arranged that the normal load thrust on the rubber part is carried by rubber in shear, comprising a metal load support bonded to the rubber part.

10. In a support, a surrounding shell, a rubber part in load carrying relation to and projecting from said shell, said rubber part being bonded to said shell and disposed a substantial distance from the end of the shell forming a recess providing for movement toward the offset free edge of the shell, and means receiving a load carried by the rubber part, said support being so constructed and arranged that the normal load thrust on the rubber part is carried by rubber in shear.

11. In a support, a surrounding shell, a rubber part in load carrying relation to and projecting from said shell, said rubber part being bonded to said shell and disposed a substantial distance from the end of the shell forming a recess providing for movement toward the offset free edge of the shell, and extending beyond the opposite edge of the shell and adapted to receive the normal load on the rubber part with its load thrust spaced from the shell and carried by the rubber in shear relatively to the shell.

12. In a support, a surrounding shell, a rubber part in load carrying relation to and projecting from said shell, said rubber part being bonded to said shell and disposed a substantial distance from the end of the shell forming a recess providing for movement toward the offset free edge of the shell, and extending beyond the opposite edge of the shell and adapted to receive the normal load on the rubber part with its load thrust spaced from the shell and carried by the rubber in shear relatively to the shell, and metal load supporting means bonded to the extended end of the rubber part.

13. In a support, opposed supporting wall parts substantially undeformable under normal load, comparatively flexible rubber means having portions in load carrying relation, having union with and projecting angularly from the opposed wall parts, and disposed a substantial distance from the end of the supporting wall parts forming a recess providing for movement of the rubber portion toward the offset free edges of the wall parts, and means receiving a load carried by the rubber means, said support being so constructed and arranged that the normal load thrust on the rubber portions are carried by rubber in shear.

14. In a support, rigid opposed supporting wall parts, rubber means having portions bonded to the opposed wall parts and projecting therefrom in load carrying relation thereto and disposed a substantial distance from the end of the supporting wall parts forming a recess providing for movement toward the offset free edge of the wall parts, and extending beyond the opposite edge of the opposed wall parts and adapted to receive the normal load on the rubber part with its load thrust spaced from the opposed wall parts and carried by the rubber in shear relatively to the opposed wall parts.

15. In a support, opposed supporting wall parts substantially undeformable under normal load, comparatively flexible rubber means having portions in load carrying relation, having union with and projecting angularly from the opposed wall parts, and disposed a substantial distance from the end of the supporting wall parts forming a recess providing for movement of the rubber portion toward the offset free edges of the wall parts, and means receiving a load carried by the rubber means, said support being so constructed and arranged that the normal load thrust on the rubber portions are carried by rubber in shear, comprising a metal load support bonded to the rubber portions and receiving the load.

16. In a support, opposed supporting wall parts substantially undeformable under normal load, comparatively flexible rubber means having portions in load carrying relation, having union with and projecting angularly from the opposed wall parts, and disposed a substantial distance from ends of the opposed wall parts and extending beyond the opposite ends of the parts and adapted to receive the normal load on the rubber part with its load thrust spaced from the opposed wall parts and carried by the rubber in shear relatively to the opposed wall parts.

17. In a support, a rigid supporting side wall, a flexible rubber part bonded to the wall and projecting therefrom in load carrying relation thereto, and disposed a substantial distance from an end of the supporting wall forming a recess providing for movement of the rubber part toward the offset free edge of the side wall, and means receiving a load carried by the rubber part, said support being so constructed and arranged that the normal load thrust on the rubber part is carried by the rubber in shear, the rubber at the recessed end extending over the edge of the supporting wall forming a cushion support for the supporting wall.

In testimony whereof I have hereunto set my hand.

IRVING P. WHITEHOUSE.